(12) United States Patent
Huebner et al.

(10) Patent No.: US 10,131,282 B2
(45) Date of Patent: Nov. 20, 2018

(54) SEAT EXTENDER/BARRIER PANEL FOR A MOTOR VEHICLE

(71) Applicant: FORD GLOBAL TECHNOLOGIES, LLC, Dearborn, MI (US)

(72) Inventors: Annette Lynn Huebner, White Lake, MI (US); Kristin Ann Hellman, Walled Lake, MI (US); Artur Stanislavovich Sakarian, Ann Arbor, MI (US); Christian John Hosbach', Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/353,364

(22) Filed: Nov. 16, 2016

(65) Prior Publication Data

US 2018/0134225 A1    May 17, 2018

(51) Int. Cl.
*B60R 7/04*    (2006.01)
*B60N 2/90*    (2018.01)
*B60R 11/00*    (2006.01)

(52) U.S. Cl.
CPC .............. *B60R 7/043* (2013.01); *B60N 2/90* (2018.02); *B60R 2011/0012* (2013.01)

(58) Field of Classification Search
CPC ............. B60R 7/043; B60R 2011/0012; B60R 2011/0014; B60R 2011/0015; B60N 2/44; B60N 2/90
USPC .......... 224/275; 297/188.01, 188.21, 188.12, 297/188.08; 108/44
See application file for complete search history.

(56) References Cited

U.S. PATENT DOCUMENTS

| | | | |
|---|---|---|---|
| 2,173,569 A * | 9/1939 | Troendle ................ | B60N 3/004 108/134 |
| 2,750,088 A * | 6/1956 | Agostini .............. | A47B 81/005 211/64 |
| 3,982,787 A | 9/1976 | Moll | |
| 4,943,105 A | 7/1990 | Kacar et al. | |
| 5,908,218 A | 6/1999 | Martin | |
| 5,967,602 A | 10/1999 | Ptak et al. | |
| 6,375,259 B1 * | 4/2002 | Ma .......................... | A47C 7/72 297/154 |
| 7,311,356 B2 | 12/2007 | Pudney | |
| 8,360,519 B1 * | 1/2013 | Hsu ........................ | B60R 7/043 224/275 |
| 2006/0061152 A1 * | 3/2006 | Pudney .................. | B60R 7/043 297/188.01 |
| 2010/0171350 A1 * | 7/2010 | Large .................... | B60N 3/002 297/217.3 |

FOREIGN PATENT DOCUMENTS

| | | | | |
|---|---|---|---|---|
| AU | 7828075 A | | 8/1976 | |
| JP | 2005289339 A | * | 10/2005 | ............. B60R 7/043 |

* cited by examiner

*Primary Examiner* — Scott McNurlen
(74) *Attorney, Agent, or Firm* — Vichit Chea; King & Shickli, PLLC (57) ABSTRACT

A cargo assist apparatus is provided for a motor vehicle. That cargo assist apparatus includes a panel and a translating and pivoting connector whereby the panel is displaced between a stowed position below an upper face of the seat bottom, a first deployed position projecting above the upper face and a second deployed position projecting forward from the upper face.

17 Claims, 11 Drawing Sheets

SEAT EXTENDER/BARRIER PANEL FOR A MOTOR VEHICLE

TECHNICAL FIELD

This document relates generally to the motor vehicle equipment field and, more particularly, to a cargo assist apparatus in the form of a seat extender/barrier panel useful for carrying cargo on an upper surface of a seat bottom of a motor vehicle.

BACKGROUND

A great many devices have been developed that are adapted to aid one in transporting cargo in a motor vehicle. This document relates to a new and improved cargo assist apparatus, in the form of a seat extender/barrier panel, that provides a number of benefits and advantages above and beyond those available from state-of-the-art cargo assist devices.

More specifically, the cargo assist apparatus disclosed in this document provides a built-in mechanism adapted to create a nearly continuous surface that extends all the way up to the back of the front row seats. This is particularly useful when carrying certain cargo and pets as it prevents that cargo from falling and ending up in the rear footwell in front of the rear seat. The cargo assist apparatus also provides a built-in mechanism that creates covered storage in the rear footwell area so that things may be stored out of sight.

Further, the cargo assist apparatus may function as a barrier so that items placed on the rear seat do not fall into the rear footwell during driving maneuvers and hard stops. Accordingly, it should be appreciated that the cargo assist apparatus disclosed herein represents a significant advance in the art, providing a significant benefit to those motor vehicle owners wishing to configure the rear seat area for more efficiently and effectively carrying cargo across a wide number of applications.

SUMMARY

In accordance with the purposes and benefits described herein, a cargo assist apparatus is provided for a motor vehicle. That cargo assist apparatus comprises a panel and a translating and pivoting connector whereby that panel is displaced between a stowed position below an upper surface of a seat bottom, a first deployed position projecting above the upper surface and a second deployed position projecting forward from the upper surface.

The translating and pivoting connector of the cargo assist apparatus includes a slider and a panel support wherein the panel support is pivotally connected at a first end to the panel and at a second end to the slider. Further, the translating and pivoting connector includes a guide carried on a motor vehicle support. The slider translates along that guide. The guide may include an elongated T-shaped slot and the motor vehicle support may comprise the floor of the motor vehicle under the seat bottom.

The cargo assist apparatus may further include a flap pivotally connected to the panel and displaceable between a home position extending along the panel and a projecting position. In addition, the cargo assist apparatus may further include a first stability link connected at a first end to a first edge of the panel. The cargo assist apparatus may also include a first guide track on the first edge of the panel. The first stability link may include a first follower riding in that first guide track.

The cargo assist apparatus may further include a second stability link connected at a second end to a second edge of the panel. Further, the cargo assist apparatus may include a second guide track on the second edge of the panel. The second stability link may include a second follower riding in that second guide track.

Still further, the cargo assist apparatus may include a first pivot connection between a third end of the first stability link and the motor vehicle and a second pivot connection between a fourth end of the second stability link and the motor vehicle.

Still further, the panel support may include a shell having a first section and a second section and a tension device held in a cavity within the shell. The first section may include a neck and the second section may include an opening that receives that neck. Further, the tension device may be a component selected from a group consisting of a spring and a resilient elastomer insert.

In accordance with an additional aspect, a cargo assist apparatus is provided for a motor vehicle. That cargo assist apparatus comprises a panel and a translating and pivoting connector. The translating and pivoting connector connects the panel to a motor vehicle support whereby the panel may be displaced between a stowed position and multiple deployed positions for carrying cargo on a rear seat of the motor vehicle.

In accordance with still another aspect, a method is provided for carrying cargo on a seat bottom of a motor vehicle. That method comprises the step of equipping a motor vehicle with a cargo assist apparatus that is displaceable into a stowed position below an upper surface of the seat bottom, a first deployed position projecting above the upper surface and a second deployed position projecting forward of the upper surface.

In the following description, there are shown and described several preferred embodiments of the cargo assist apparatus as well as the related method of carrying cargo on a seat bottom of a motor vehicle. As it should be realized, the cargo assist apparatus and method are capable of other, different embodiments and their several details are capable of modification in various, obvious aspects all without departing from the cargo assist apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cargo assist apparatus and the related method and together with the description serve to explain certain principles thereof. In the drawing figures.

Reference will now be made in detail to the present preferred embodiments of the cargo assist apparatus, examples of which are illustrated in the accompanying drawing figures.

DETAILED DESCRIPTION

Figure 1:
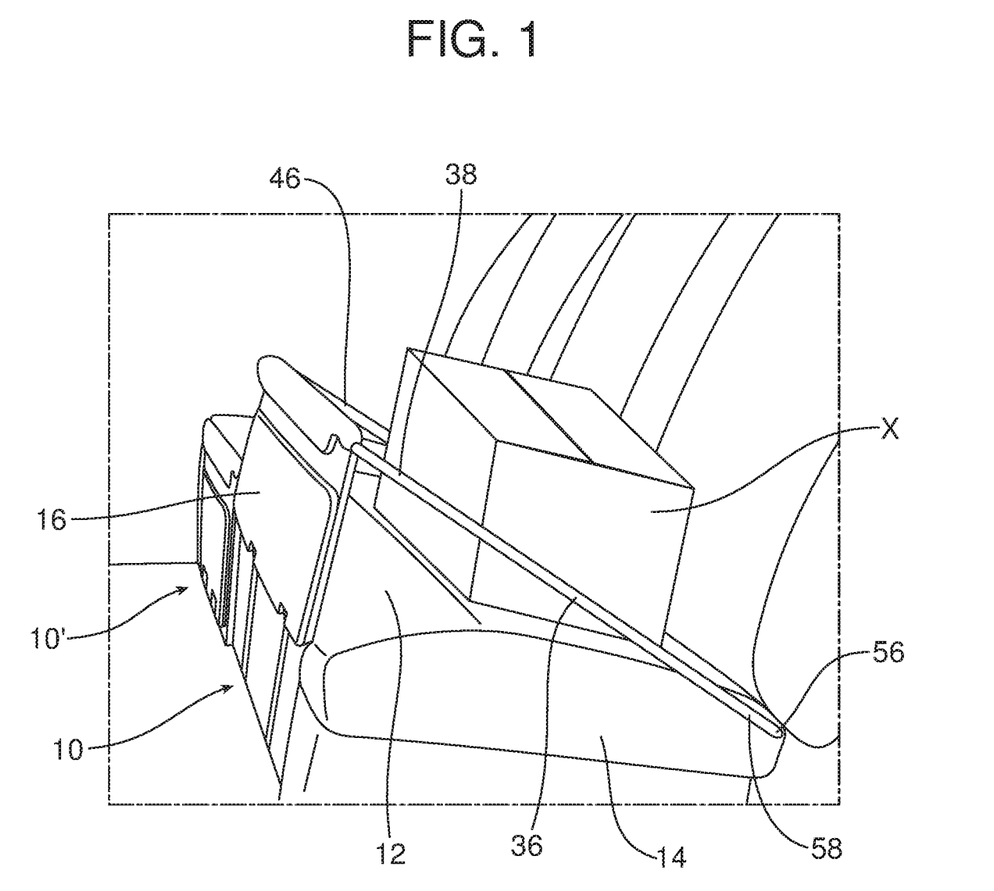
FIG. 1 is a perspective view illustrating the cargo assist apparatus in a first deployed position projecting above an upper surface of a seat bottom within a motor vehicle.
Figure 2A:
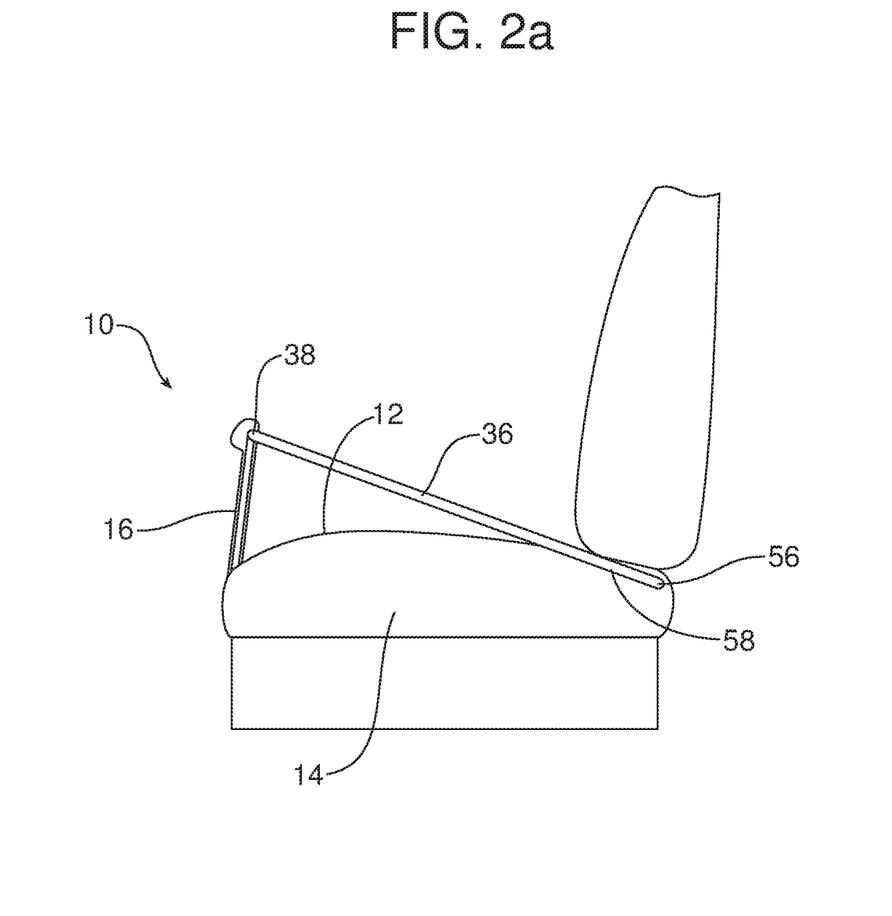
FIG. 2a is a side elevational view illustrating the cargo assist apparatus in that first deployed position.
Figure 2B:
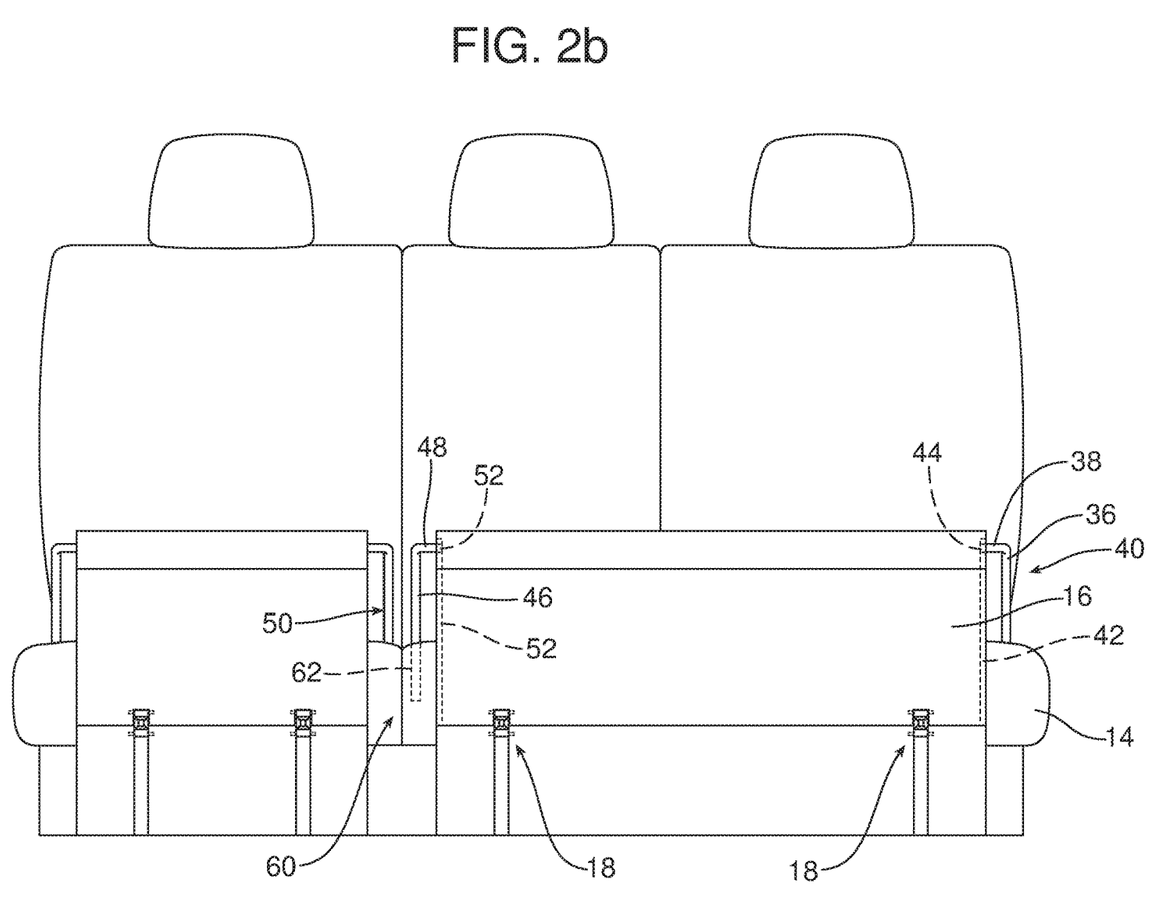
FIG. 2b is a front elevational view illustrating that cargo assist apparatus in the first deployed position.
Figure 3A:
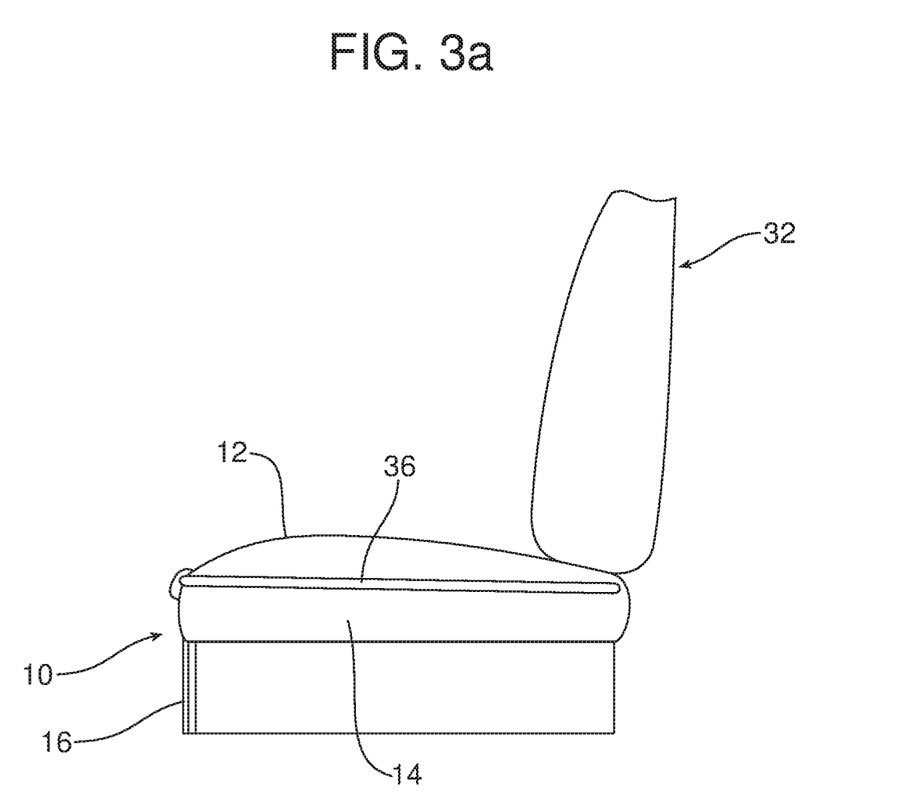
FIG. 3a is a side elevational view illustrating the cargo assist apparatus with the panel thereof in the stowed position below an upper face of the seat bottom.
Figure 3B:
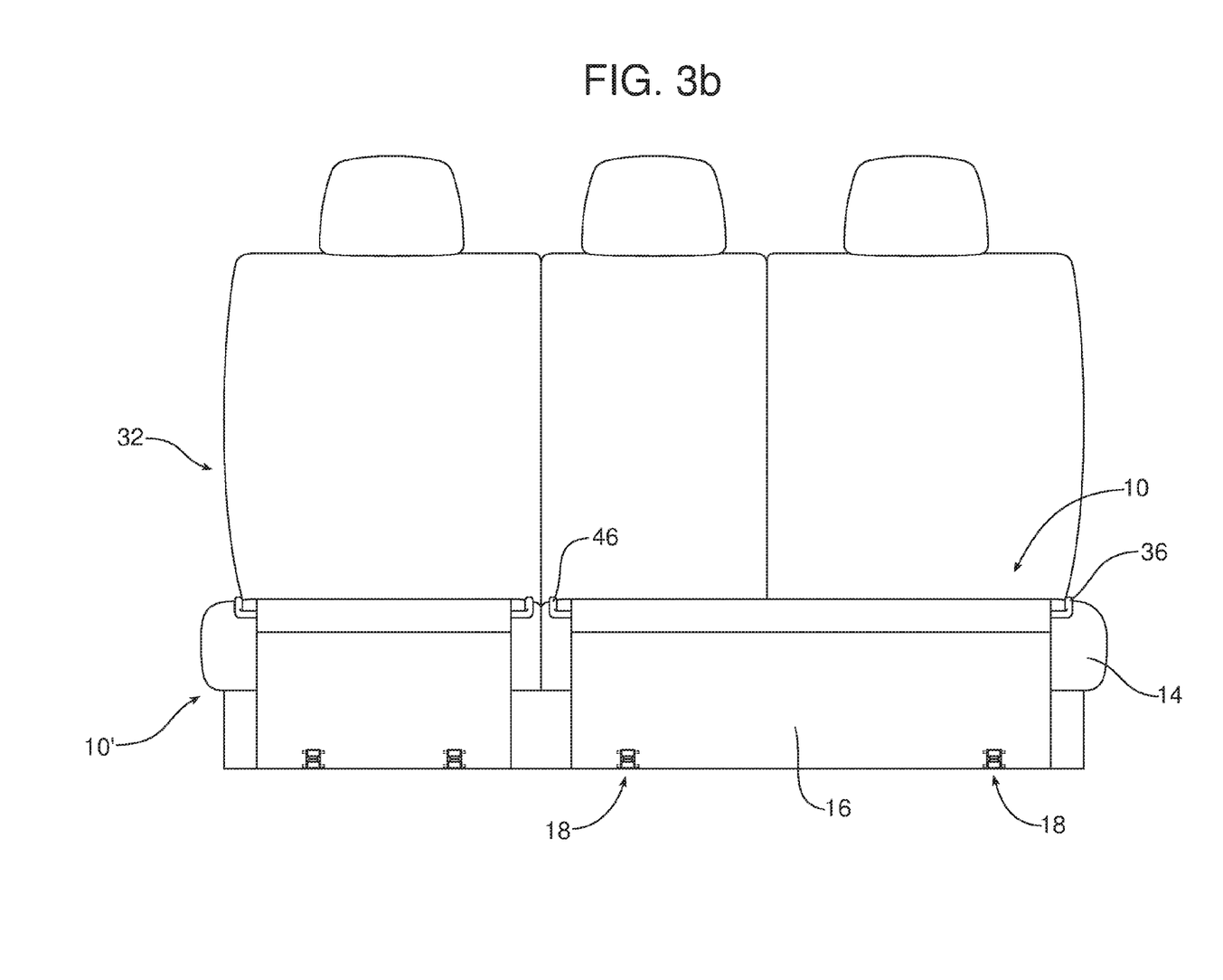
FIG. 3b is a front elevational view that also illustrates the panel of the cargo assist apparatus in the stowed position.
Figure 4A:
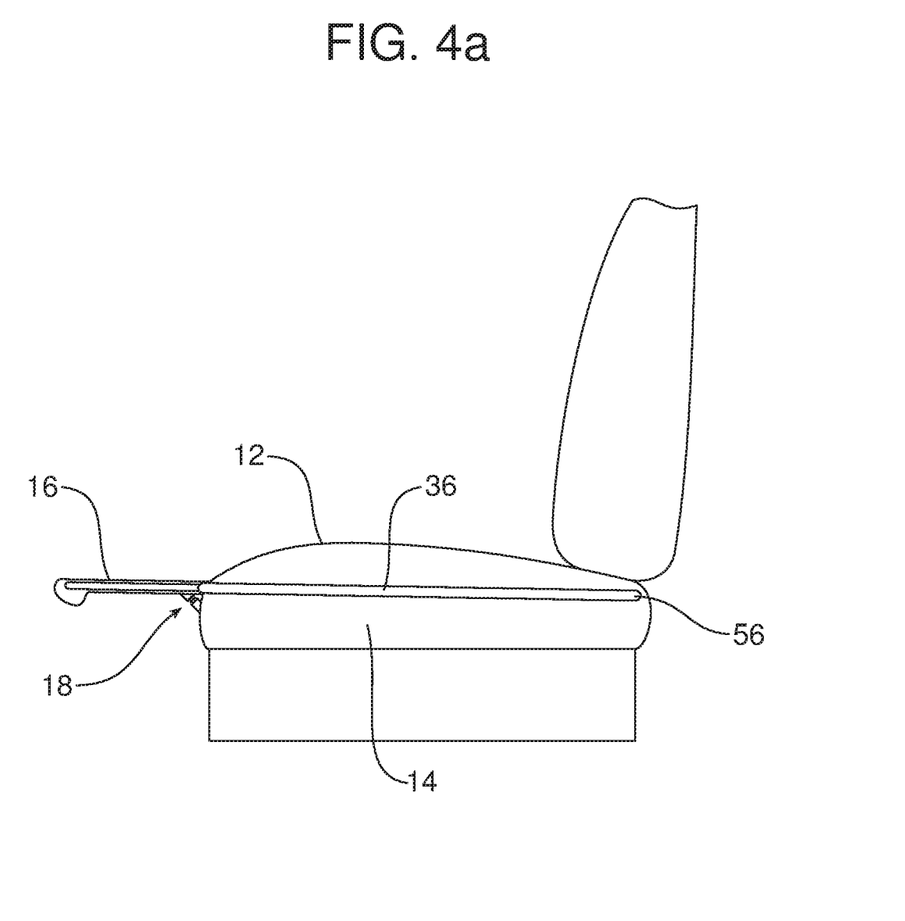
FIG. 4a is a side elevational view illustrating the panel of the cargo assist apparatus in a second deployed position projecting forward from an upper surface of the seat bottom.
Figure 4B:
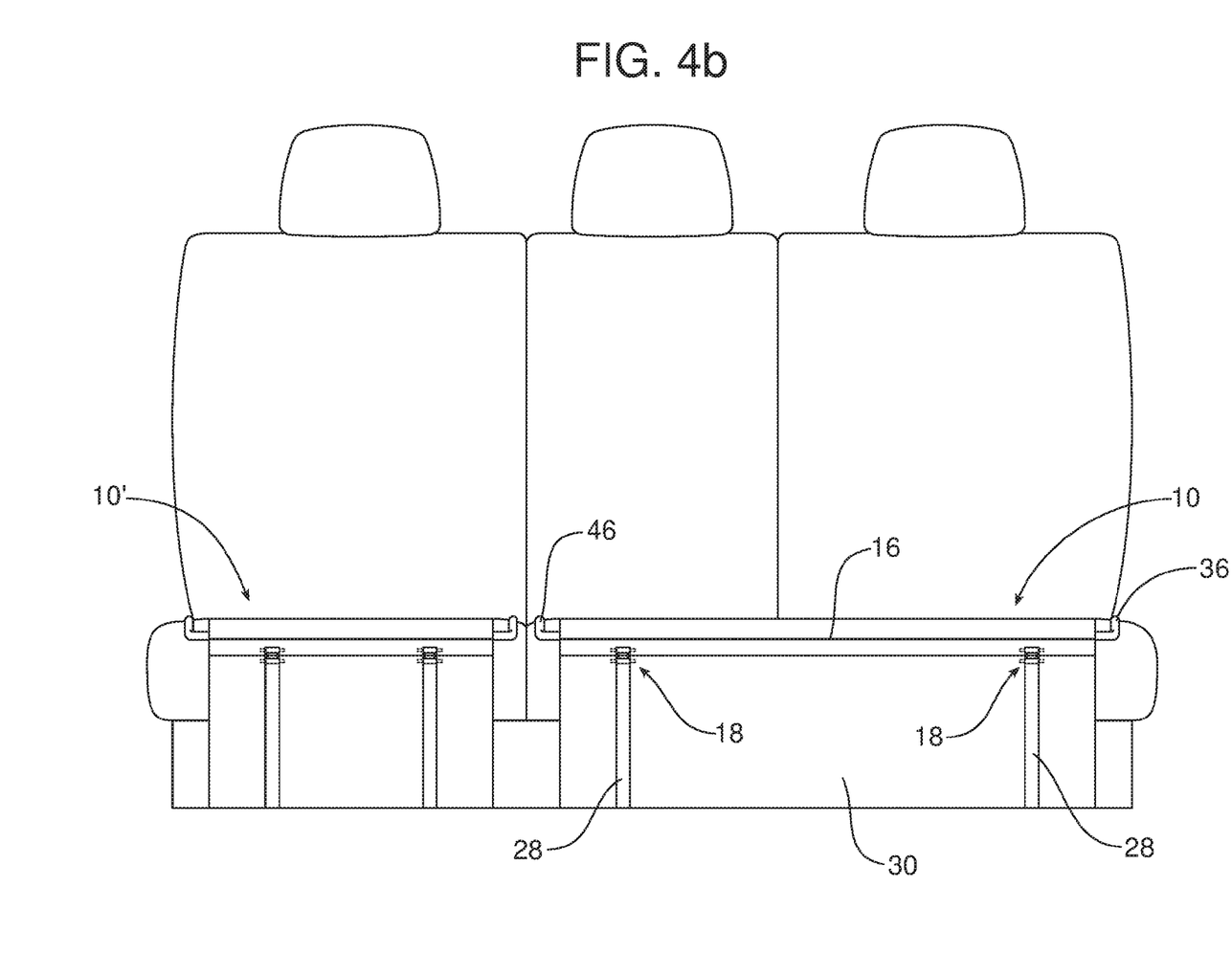
FIG. 4b is a front elevational view also illustrating the panel of the cargo assist apparatus in the second deployed position.
Figure 4C:
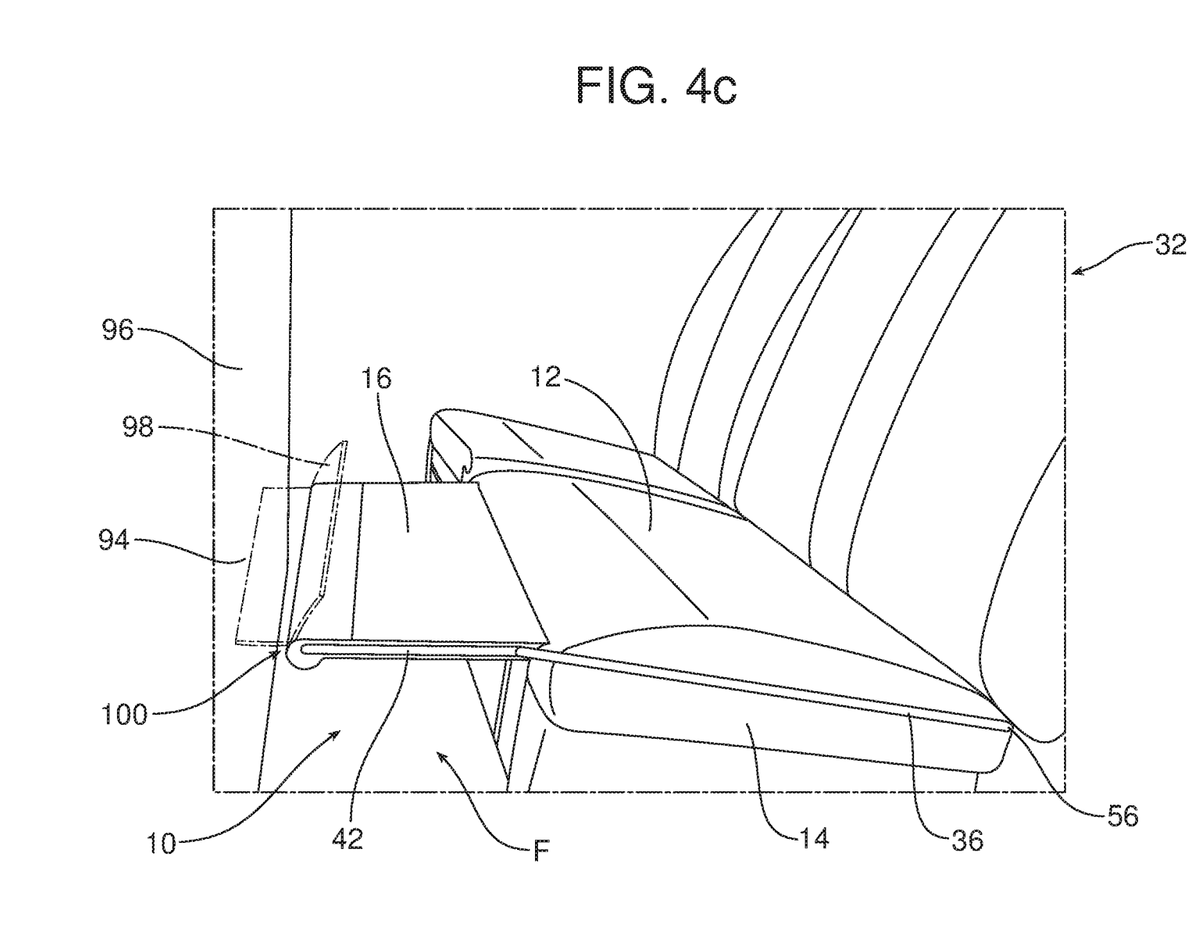
FIG. 4c is a perspective view illustrating how a pivoting flap carried on the panel may be pivoted forward into engagement with the rear face of the front seat so as to effectively close off the rear footwell from view and prevent anything from rolling off the upper surface of the rear seat into the rear footwell.

Reference is now made to FIGS. 1-4c illustrating the cargo assist apparatus 10 that allows one to convert the upper surface 12 of a seat bottom 14 into an effective cargo hauling platform for a number of different cargo hauling applications (note, for example, box X illustrated in FIG. 1). As illustrated in FIGS. 1, 2a and 2b the cargo assist apparatus 10 incorporates a panel 16 and a translating and pivoting connector 18 whereby the panel may be displaced between a stowed position forward and below the upper surface 12 of the seat bottom 14 as illustrated in FIGS. 3a and 3b, a first deployed position projecting above the upper surface as illustrated in FIGS. 1, 2a and 2b and a second deployed position projecting forward from the upper surface as illustrated in FIGS. 4a-4c.

As best illustrated in FIGS. 2b, 3b, 4b and 5a-5c, the translating and pivoting connector 18 includes a carriage or slider 20 and a panel support 22 wherein the panel support is pivotally connected at a first end 24 by a first axle or pivot connection 25 to the panel 16 and at a second end 26 by a second axle or pivot connection 27 to the slider 20.

The translating and pivoting connector 18 also includes a guide 28 carried on a motor vehicle support 30. In the illustrated embodiment, the motor vehicle support 30 comprises the sheet metal floor that forms a platform for holding the rear seat 32 including the seat bottom 14. The guide 28 may include an elongated T-shaped slot 34 and the slider 20 translates along that guide 28 or T-shaped slot 34.

As further illustrated in FIGS. 1-4c, the cargo assist apparatus 10 further includes a first stability link 36 connected at a first end 38 to a first edge 40 of the panel 16. More specifically, a first guide track 42 is provided on the first edge 40 of the panel 16 and the first stability link 36 includes a first follower 44 that rides in the first guide track 42.

As further illustrated, the cargo assist apparatus 10 also includes a second stability link 46 connected at a second end 48 to a second edge 50 of the panel 16. A second guide track 52 is provided on the second edge 50 of the panel 16 and the second stability link 46 includes a second follower 54 riding in the second guide track 52.

As further illustrated, a first pivot connection 56 is provided between a third end 58 of the first stability link 36 and the motor vehicle and a second pivot connection 60 between a fourth end 62 of the second stability link 46 and the motor vehicle.

Figure 5A:
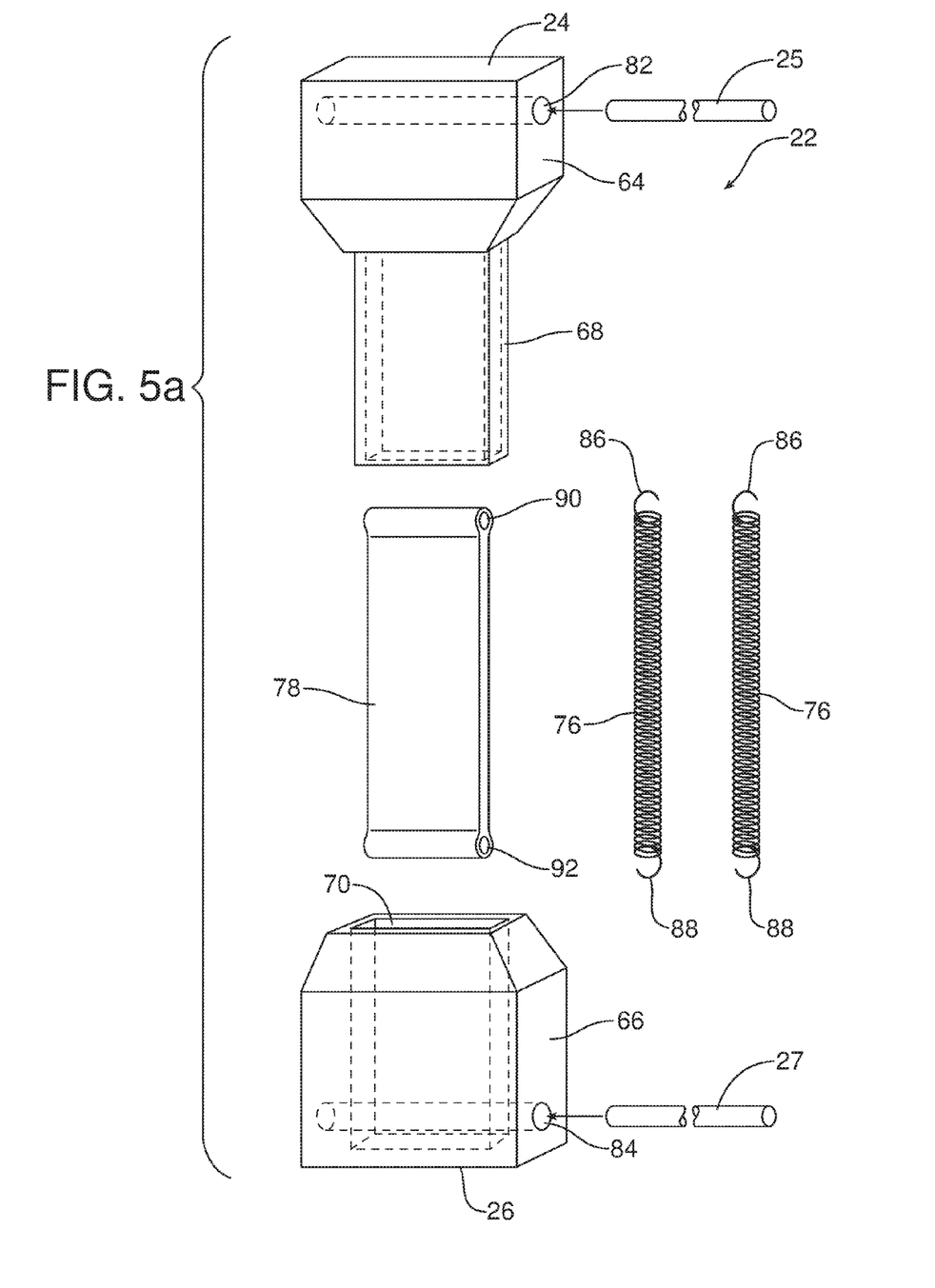
FIG. 5a is a detailed exploded perspective view of the panel support.
Figure 5B:
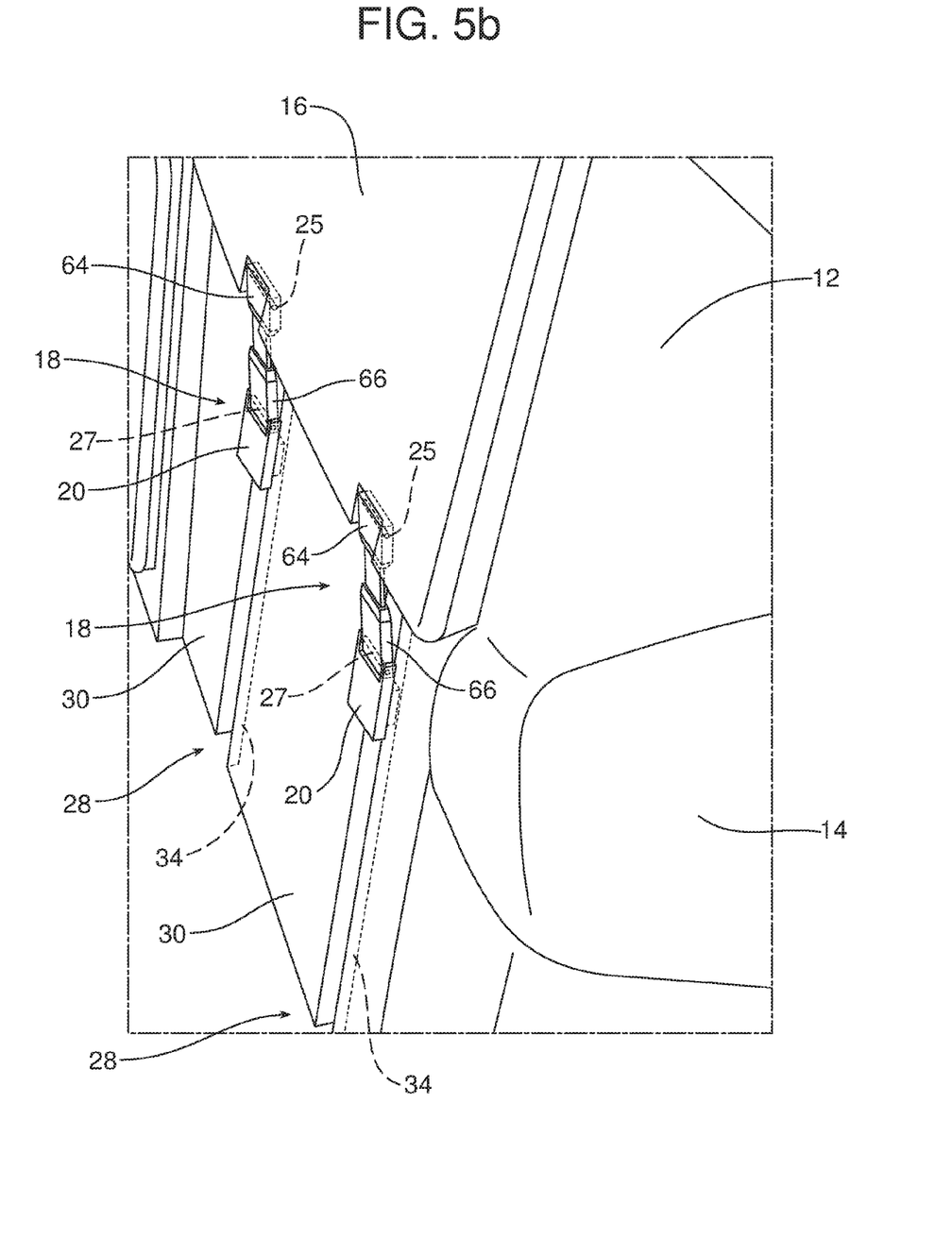
FIG. 5b is a detailed side elevational view illustrating the panel support in the extended position.
Figure 5C:
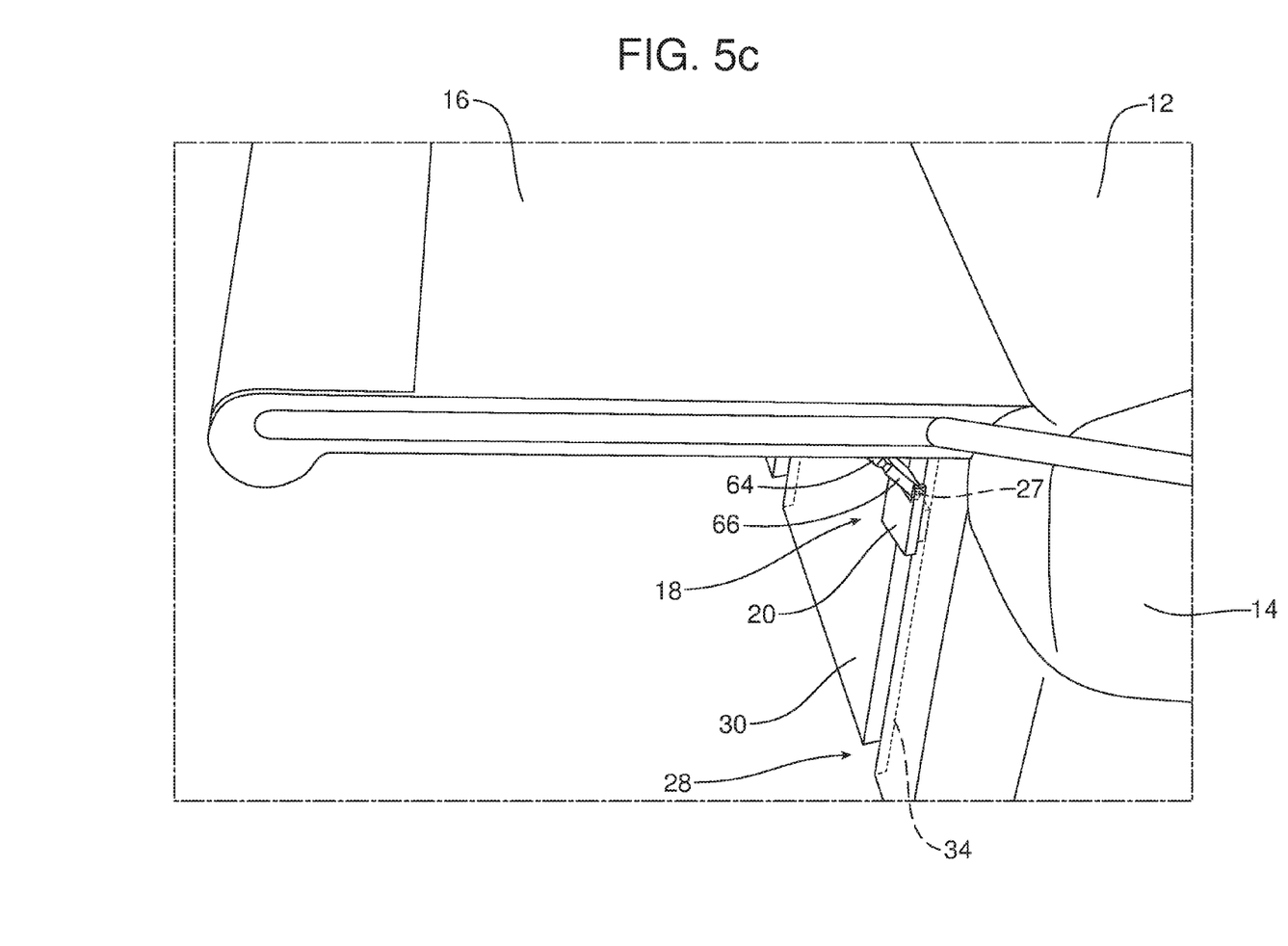
FIG. 5c is a detailed side elevational view illustrating the panel support in the collapsed or contracted position.

Reference is now made to FIGS. 5a-5c which illustrate the panel support 22 in detail. The panel support 22 comprises a hard shell body having a first section 64 and a second section 66. More specifically, the first section 64 includes a neck 68 and the second section 66 includes an opening 70 that receives the neck. A tension device 72 is held in a cavity defined by the first section 64 and the second section 66 of the shell. As illustrated in FIG. 5a, the tension device 72 may comprise a tension spring 76 or resilient or elastomeric insert 78.

As previously noted, the first end 24 of the panel support 22 is pivotally connected to the panel 16 by means of the first axle or pivot connection 25. Note aperture 82 in the first section 64 that receives the first axle or pivot connection 25. The second end 26 of the panel support 22 is pivotally connected to the slider 20 by means of the second axle or pivot connection 27. Note aperture 84 in the second section 66 that receives the second axle or pivot connection 27.

Where the tension device 72 is a tension spring 76 (two shown), the first end 86 of the tension spring is connected to the first axle or pivot connection 25 while the second end 88 of the tension spring is connected to the second axle or pivot connection 27. Where the tension device 72 is a resilient elastomer insert 78, the first axle or pivot connection 25 extends through the aperture 90 of the resilient elastomer insert while the second axle or pivot connection 25 extends through the second aperture 92 of the resilient elastomer insert.

When the panel 16 is in the stowed position illustrated in FIGS. 3a and 3b and the first deployed position illustrated in FIGS. 1, 2a and 2b, the panel support 22 is in the extended position illustrated in FIG. 5b. One displaces the panel 16 between the stowed position and the first deployed position by simply pulling upward on the panel 16 or either stability link 36, 46. As this is done, the slider 20 slides along the guide 28 and the two stability links 36, 46 pivot about their respective pivot connections 56, 60.

When one displaces the panel 16 from the first deployed position illustrated in FIGS. 1, 2a and 2b to the second deployed position illustrated in FIGS. 4a and 4b, the panel 16 is folded in a motor vehicle forward direction toward the rear face 94 of the front seat back 96 about the pivot connection 27 at the slider 20 and the first and second stability links 36, 46 are translated along the respective first and second guide tracks 42, 52 from one end to the other. When panel 16 is fully seated in the second deployed position as illustrated in FIGS. 4a and 4b, the panel support 22 is in the collapsed or contracted position illustrated in FIG. 5b wherein the first section 64 and second section 66 of the shell abut so that the panel support 22 becomes weight supporting.

As illustrated in FIG. 4c, a flap 98 is pivotally connected to the panel 16 by means of a hinge, generally designated by reference numeral 100. As shown, the flap 98 is displaceable between a home position extending along the face of the panel 16 and a projecting position. The projecting position may extend upwardly substantially perpendicular to the panel or past vertical so as to project toward and actually engage the rear face 94 of the front seat back 96 so as to fully close off the gap between the rear seat bottom 14 and the rear face 94 of the front seat back 96. In such a position, the cargo assist apparatus 10 effectively fully conceals the rear footwell F from view so the cargo may be stored out of sight. Further, the cargo assist apparatus 10 effectively prevents any cargo resting on the upper surface 12 of the seat bottom 14 from sliding forward and falling into the rear footwell area.

In the illustrated embodiment, the rear seat 32 is in a 60/40 configuration and a cargo assist apparatus 10 is provided for each of the two sections of the rear seat. Only one cargo assist apparatus 10 has been described above in detail but it should be appreciated that the second cargo assist apparatus 10' is of similar construction and functions in the same manner so as to be deployable between a stowed position, a first deployed position and a second deployed position as illustrated in the drawing figures.

Further, as illustrated in the drawing figures, each cargo assist apparatus 10 includes two translating and pivoting connectors 18, each comprising a slider 20 and a panel support 22 as described above in detail and illustrated in FIGS. 5a-5c. Here it should be appreciated that substantially any number of translating and pivoting connectors 18 may be provided for each panel 16 depending on the size of the panel. For example, if the rear seat 32 included a single panel extending across the entire width of the rear seat 32, four, five or even six translating and pivoting connectors 18 could be provided.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A cargo assist apparatus for a motor vehicle, comprising:
    a panel;
    a translating and pivoting connector including:
        a slider and a panel support, said panel support being pivotally connected to said panel and to said slider; and
        a guide including an elongated T-shaped slot, the guide being carried on a motor vehicle support, said motor vehicle support adapted for connection to the motor vehicle, wherein the slider translates along said guide; and
    a flap pivotally connected to said panel and displaceable between a home position extending along said panel and a projecting position;
    whereby said panel is displaced between a stowed position below an upper face of a seat bottom, a first deployed position projecting above said upper face and a second deployed position projecting forward from said upper face.

2. The cargo assist apparatus of claim 1, further including a first stability link connected at a first end to a first edge of said panel.

3. The cargo assist apparatus of claim 2, further including a first guide track on said first edge of said panel, said first stability link including a first follower riding in said first guide track.

4. The cargo assist apparatus of claim 3, further including a second stability link connected at a second end to a second edge of said panel.

5. The cargo assist apparatus of claim 4, further including a second guide track on said second edge of said panel, said second stability link including a second follower riding in said second guide track.

6. The cargo assist apparatus of claim 5, further including a first pivot connection at a third end of said first stability link, said first pivot connection adapted for connecting to the motor vehicle, and a second pivot connection at a fourth end of said second stability link, said second pivot connection adapted for connecting to the motor vehicle.

7. The cargo assist apparatus of claim 6, wherein said panel support includes a shell having a first section and a second section and a tension device held in a cavity within said shell.

8. The cargo assist apparatus of claim 7, wherein said first section includes a neck and said second section includes an opening that receives said neck.

9. The cargo assist apparatus of claim 8, wherein said tension device is a component selected from a group consisting of a spring and a resilient elastomer insert.

10. A cargo assist apparatus for a motor vehicle, comprising:
    a panel;
    a translating and pivoting connector connecting said panel to a motor vehicle support, said motor vehicle support adapted for connection to the motor vehicle, whereby said panel may be displaced between a stowed position below an upper face of a seat bottom, a first deployed position projecting above said upper face and a second deployed position projecting forward from said upper face, for carrying cargo on a seat bottom of said motor vehicle; and
    a first stability link including a first end connected to a first edge of said panel and further including a second end adapted for connection to a portion of the motor vehicle, said first stability link being translatable along said first edge of said panel.

11. The cargo assist apparatus of claim 10, further including a first guide track on said first edge of said panel, said first stability link including a first follower riding in said first guide track.

12. The cargo assist apparatus of claim 11, further including a second stability link connected at a second end to a second edge of said panel.

13. The cargo assist apparatus of claim 12, further including a second guide track on said second edge of said panel, said second stability link including a second follower riding in said second guide track.

14. The cargo assist apparatus of claim 10, wherein the translating and pivoting connector includes a slider and a panel support, said panel support being pivotally connected to said panel and to said slider.

15. The cargo assist apparatus of claim 14, wherein said panel support includes a shell having a first section and a second section and a tension device held in a cavity within said shell.

16. The cargo assist apparatus of claim 15, wherein said first section includes a neck and said second section includes an opening that receives said neck.

17. The cargo assist apparatus of claim 16, wherein said tension device is a component selected from a group consisting of a spring and a resilient elastomer insert.

* * * * *